(12) United States Patent
Birdwell, Jr. et al.

(10) Patent No.: US 8,097,219 B2
(45) Date of Patent: Jan. 17, 2012

(54) INTEGRATED REACTOR AND CENTRIFUGAL SEPARATOR AND USES THEREOF

(75) Inventors: Joseph F Birdwell, Jr., Knoxville, TN (US); Harold L. Jennings, Clinton, TN (US); Joanna McFarlane, Oak Ridge, TN (US); Constantino Tsouris, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 211 days.

(21) Appl. No.: 12/540,401

(22) Filed: Aug. 13, 2009

(65) Prior Publication Data

US 2010/0008835 A1    Jan. 14, 2010

Related U.S. Application Data

(63) Continuation-in-part of application No. 12/128,157, filed on May 28, 2008.

(51) Int. Cl.
*B01J 8/08*    (2006.01)
*B01J 35/02*   (2006.01)
*B01J 8/02*    (2006.01)
*B01J 19/00*   (2006.01)
*B01J 8/00*    (2006.01)

(52) U.S. Cl. ........ 422/209; 422/129; 422/198; 422/211; 422/234

(58) Field of Classification Search .................. 422/209, 422/234, 129, 211; 44/300, 301, 307, 308
See application file for complete search history.

(56) References Cited

U.S. PATENT DOCUMENTS

| | | | |
|---|---|---|---|
| 2,474,006 A | 6/1949 | Maycock | |
| 2,995,612 A | 8/1961 | Hervert | |
| 3,915,673 A | * 10/1975 | Tamai et al. | ..................... 95/35 |
| 4,398,024 A | 8/1983 | Bernert | |

(Continued)

FOREIGN PATENT DOCUMENTS

DE    4138612 C1    4/1993

(Continued)

OTHER PUBLICATIONS

Hossein Noureddini, "High Shear Mixing Reactor for Glycerolysis," Chemical and Biomolecular Engineering Research and Publications, 1994, University of Nebraska, Lincoln.
Noureddini, Harkey and Medikonduru, "A Continuous Process for the Conversion of Vegetable Oils into Methyl Esters of Fatty Acids," JAOCS, 1998, pp. 1775-1783m vol. 75, No. 12 AOCS Press.
Jon van Gerpen, "Biodiesel Production Technologies," University of Idaho, 2004.

(Continued)

*Primary Examiner* — Walter D Griffin
*Assistant Examiner* — Natasha Young
(74) *Attorney, Agent, or Firm* — Luedeka, Neely & Graham, P.C.

(57) ABSTRACT

An apparatus for providing reaction of fluids and separation of products with increased residence time. The apparatus includes a stationary shell, a rotating hollow cylindrical component disposed in the stationary shell, a residence-time increasing device external to the stationary shell, a standpipe for introducing fluid into an interior cavity of the hollow cylindrical component from the residence-time increasing device, a first outlet in fluid flow communication with the interior cavity of the hollow cylindrical component for a less dense phase fluid, and a second outlet in fluid flow communication with the interior cavity of the hollow cylindrical component for a more dense phase fluid.

18 Claims, 6 Drawing Sheets

U.S. PATENT DOCUMENTS

| | | | |
|---|---|---|---|
| 4,806,019 A | 2/1989 | Lutwick et al. | |
| 4,824,430 A | 4/1989 | Kashihara et al. | |
| 4,857,040 A | 8/1989 | Kashihara et al. | |
| 4,959,158 A * | 9/1990 | Meikrantz | 210/787 |
| 5,254,076 A | 10/1993 | Chow et al. | |
| 5,267,936 A * | 12/1993 | Miachon | 494/22 |
| 5,571,070 A | 11/1996 | Meikrantz et al. | |
| 6,203,483 B1 | 3/2001 | Birdwell et al. | |
| 6,262,285 B1 | 7/2001 | McDonald | |
| 6,342,627 B1 | 1/2002 | Oda et al. | |
| 6,379,293 B1 | 4/2002 | Kim et al. | |
| 6,489,496 B2 | 12/2002 | Barnhorst et al. | |
| 6,699,169 B2 | 3/2004 | Orino et al. | |
| 6,976,947 B2 * | 12/2005 | Ogino et al. | 494/22 |
| 7,098,360 B2 | 8/2006 | Holl et al. | |
| 7,165,881 B2 | 1/2007 | Holl | |
| 2004/0126273 A1 * | 7/2004 | Forney et al. | 422/22 |
| 2006/0011563 A1 | 1/2006 | Meikrantz | |
| 2007/0199238 A1 * | 8/2007 | Hooker | 44/301 |
| 2007/0219340 A1 | 9/2007 | Lichtenberger et al. | |
| 2007/0232818 A1 | 10/2007 | Crawford et al. | |
| 2008/0226513 A1 | 9/2008 | Morbidelli et al. | |
| 2009/0293346 A1 | 12/2009 | Birdwell et al. | |
| 2010/0175311 A1 | 7/2010 | Allen et al. | |

FOREIGN PATENT DOCUMENTS

| | | |
|---|---|---|
| DE | 4328795 A1 | 3/1995 |
| DE | 10059084 A1 | 6/2002 |
| WO | 2007031332 A1 | 3/2007 |
| WO | 2008122026 | 10/2008 |
| WO | 2008135211 A1 | 11/2008 |
| WO | 2009145954 | 12/2009 |

OTHER PUBLICATIONS

Gerpen, Shanks, Pruszko, Clements, Knothe, "Biodiesel Production Technology," NREL/SR-510-36244, 2004, pp. 1-105.

Kraai G.N.; Schuur B.; Van Zwol F.; Van De Bovenkamp H.H.; Heeres H.J.: "Novel highly integrated biodiesel production technology in a centrifugal contactor separator device" Chemical Engineering Journal, Elsevier, [online] vol. 154, No. 1-3, Apr. 24, 2009, pp. 384-389.

CINC Industries: "CINC Manufacturing V-02 Operation Manual" Oct. 11, 2004, pp. 5, 25, 32.

CINC Industries, V-02 Operation Manual, Nov. 10, 2004, 35 pgs., http://www.cincmfg.com/v/vspfiles/downloadables/Manual%20V-02.swf.

Hossein Noureddini, A Continuous Process for the Conversion of Vegetable Oils into Methyl Esters of Fatty Acids, Journal of the American Oil Chemists' Society, Dec. 1, 1998, vol. 75, No. 2, p. 1175-1783.

Joanna McFarlane, Production of Biodiesel at the Kinetic Limit in a Centrifugal Reactor/Separator, Indust. & Engineering Chemistry Research, Mar. 2, 2010, p. 3160-3169.

G.N. Kraai, Novel Highly Integrated Biodiesel Production Technology in a Centrifugal Contactor Separator Device, Chemical Engineering Journal, Apr. 24, 2009. vol. 154, No. 1-3.

* cited by examiner

INTEGRATED REACTOR AND CENTRIFUGAL SEPARATOR AND USES THEREOF

RELATED APPLICATIONS

This invention is a continuation-in-part of application Ser. No. 12/128,157, filed May 28, 2008, now pending.

GOVERNMENT RIGHTS

This invention was made with government support under Contract No. DE-AC05-00OR22725 awarded by the U.S. Department of Energy. The government has certain rights in the invention.

TECHNICAL FIELD

The disclosure relates to continuous reactor/separator devices and uses thereof, in particular centrifugal separator/reactors that provide variable residence time for reaction of miscible or immiscible components and separation of liquid reaction products from reactants as well as liquid/liquid extraction operations.

BACKGROUND AND SUMMARY

Centrifugal solvent extraction contactor equipment may be used to bring two immiscible liquids into contact with one another so that chemical components of the liquids can be transferred from one liquid to the other. Fluid flow in such centrifugal solvent extraction equipment is from an annular mixing space between a rotor and an outer wall of the equipment through an opening in the lower portion of the rotor. The equipment is designed for rapid flow from the annular mixing space into an interior portion of the rotor for separation of immiscible components. The foregoing apparatus may be suitable for solute transfer but is not particularly suitable for the mixing of liquids to promote a chemical reaction or to transfer solutes between liquid components, especially when the reaction or solute transfer is relatively slow and requires more than a few seconds to occur.

For example, in the current method of manufacture of esterified vegetable oils or animal fats, a feed material containing triglycerides is reacted with a methoxide (typically sodium or potassium methoxide), resulting in the esterification of the glycerides into fatty acid methyl esters. The foregoing process is typically performed in reaction vessels in which the reactants, which are immiscible with one another, are dispersed in one another by stirring or sparging. Upon reaction, the reaction product is a dispersion of two new immiscible liquids, a solution of fatty acid methyl esters and glycerine. In a conventional manufacturing process, the dispersion product of esters and glycerine is separated by centrifugal separation or by the force of gravity by allowing the reaction products to sit undisturbed for approximately 24 hours. The recovered glycerine is disposed of; and the ester product is contacted with water or other aqueous solutions to remove excess reactants and/or unreacted glycerides. The water washing steps may be performed by centrifugal separation or by settling in large tanks that require extensive settling times to allow the wash and product solutions to separate from one another after mixing.

Problems with the foregoing manufacturing process are two fold. First, the effectiveness of the esterification reaction is limited by the extent to which the reactants are intimately mixed with one another and/or reaction kinetics. Consequently, the size of the reactor and the reaction times may be greater than theoretically necessary or the reaction may require a significant excess of methoxide making purification and recovery of reactants and products more difficult. Secondly, the current state of the art includes several washing and separation steps (processes in which dispersed, immiscible solutions must be allowed to separate over time), each of which is accomplished by gravity settling in large tanks or by the use of conventional centrifugal separation techniques.

Accordingly, what is needed is an apparatus that is suitable for promoting chemical reaction between miscible or immiscible components and separation of reaction products from reactants. It is highly desirable that such apparatus be configured for easily increasing a residence time for mixing and/or reaction or liquid/liquid contact to occur, With regard to the foregoing, the disclosure provides an apparatus for providing reaction of fluids and separation of products with increased residence time. The apparatus includes a stationary shell, a rotating hollow cylindrical component disposed in the stationary shell, a residence-time increasing device external to the stationary shell, a standpipe for introducing fluid into an interior cavity of the hollow cylindrical component from the residence-time increasing device, a first outlet in fluid flow communication with the interior cavity of the hollow cylindrical component for a less dense phase fluid, and a second outlet in fluid flow communication with the interior cavity of the hollow cylindrical component for a more dense phase fluid.

In an exemplary embodiment, the disclosure provides an apparatus for manufacturing a biodiesel product from triglycerides. The apparatus includes a centrifugal reactor/separator having a stationary shell, a rotating hollow cylindrical component disposed in the stationary shell, at least one external circulation loop for increasing residence time of fluids in the reactor/separator between a first inlet and a cavity in the rotating hollow cylindrical component, a less dense phase outlet in fluid flow communication with an interior cavity of the hollow cylindrical component, and a more dense phase outlet in fluid flow communication with the interior cavity of the hollow cylindrical component. Storage vessels are provided for reactants in fluid flow communication with the centrifugal reactor/separator. A pump is also included for pumping reactants from the storage vessels to the centrifugal reactor/separator.

An advantage of the embodiments of the disclosure is that it provides a substantially continuous process for contacting liquids or reactants and for separating liquids or reaction products that are substantially immiscible from one another while providing sufficient contacting and/or reaction time to provide relatively higher yields of product. Since an external circulation loop is provided as the residence time increasing device, modification of the residence time for a particular reaction or fluid separation scheme is readily achievable.

BRIEF DESCRIPTION OF THE DRAWINGS

Further advantages of exemplary embodiments disclosed herein may become apparent by reference to the detailed description of preferred embodiments when considered in conjunction with the drawings, which are not to scale, wherein like reference characters designate like or similar elements throughout the several drawings as follows.

DETAILED DESCRIPTION OF EXEMPLARY EMBODIMENTS

Centrifugal reactor/separators according to the disclosure may be use for a wide variety of applications including, but not limited to, chemical reactions and liquid/liquid extraction processes. For example, the centrifugal reactor/separator according to the disclosure may be used for the production of biodiesel products form triglycerides such as vegetable oils and animal fats. Esterification of the triglycerides with an alcohol in the presence of an alkoxide catalyst is a particularly suitable process for making fatty acid esters that may be used as fuel. According to one process, the following reaction takes place:

25° C. to about 300° C., more typically from about 50° C. to about 150° C. The reaction may be conducted at atmospheric pressure or may be conducted at pressures ranging from about one atmosphere to about ten atmospheres depending on the reactants. If desired, oxygen or inert gases, such as nitrogen or argon may be co-fed with the reactants into the reactor/separator, described in more detail below.

The triglyceride reactant may be obtained from a variety of animal and vegetable sources. For example, a vegetable oil selected from soybean oil, palm oil, palm kernel oil, coconut oil, canola oil, corn oil, cottonseed oil, olive oil, peanut oil, linseed oil, tung oil, sunflower oil, safflower oil, rapeseed oil, sesame oil, Chinese tallow tree oil, Physic nut oil, *Cuphea* seed oil, babassu oil, *perilla* oil, oiticica oil, castor oil, microalgal oils, and mixtures thereof may be used as the source of the triglyceride reactant. The triglyceride reactant may also be obtained from animal fats selected from beef tallow, lard, fish oils, menhaden oil, and mixtures thereof, or from uncharacterized waste sources containing the triglycerides.

The alcohol reactant may be a lower alcohol reactant containing from about 1 to about 4 carbon atoms such as methanol, ethanol, propanol, and butanol. A particularly suitable alcohol is methanol. A ratio of alcohol to triglyceride reactant may range from about 3:1 to about 15:1 on a mole basis. However, it is desirable to maintain a nearly stoichiometric molar ratio of alcohol to triglyceride reactant so that separation of the resulting product from the reactants is easier and wherein $R^1$, $R^2$, and $R^3$ are hydrocarbyl groups containing from 5 to about 28 carbon atoms, $R^4$ and $R^5$ are selected from lower alkyl groups containing from 1 to about 4 carbon atoms, and M is a metal selected from sodium, potassium, lithium, rubidium, and cesium, or a lanthanide selected from lanthanum, cerium, praseodymium, neodymium, promethium, samarium, europium, gadolinium, terbium, dysprosium, holmium, erbium, thulium, ytterbium, and lutetium. The foregoing is an equilibrium reaction. The reaction may be forced to the fatty acid ester product by the continuous removal of glycerine from the product.

In an alternative to the above described based-catalyzed reaction, an acid-catalyzed reaction system may be used. Acid catalysts that may be effective to catalyze the esterification reaction may include, but are not limited to, sulfuric acid, HCl, $BF_3$, $H_3PO_4$, and organic sulfonic acids. Although ester hydrolysis can occur by either acid or base catalysis, acid catalysis is generally believed to be more tolerant of moisture and high free fatty acid levels in the starting feedstock and, hence, more suitable for low-grade fats and grease feed stocks. A combination of based-catalyzed and acid-catalyzed reactions may also be used.

The reaction may be conducted at room temperature or at an elevated temperature, typically in the range of from about byproduct volumes are reduced. Use of the centrifugal reactor/separator according to the disclosure may enable the use of nearly stoichiometric quantities of reactants as opposed to conventional reaction systems.

In base catalysis systems, the catalyst component may be selected from metal alkoxides wherein the alkyl group contains from about 1 to about 4 carbon atoms. Particularly suitable metal alkoxides may be prepared, for example, from sodium methoxide, potassium methoxide and lithium methoxide. An amount of catalyst ranging from about one mole percent to about three mole percent based on the total moles of alcohol plus catalyst may be used.

The fatty acid ester product that is suitable for use as a biodiesel may be a methyl or ethyl ester containing an alkyl chain having from about 8 to about 22 carbon atoms. The product may be saturated or an unsaturated product having a degree of unsaturation ranging from about one to about four.

A characteristic of the foregoing reaction is that the reactants are substantially immiscible in one another. Hence, the rate of mass transfer may be limited by the contact area between the reactant phases resulting in prolonged reaction times. In order to increase the contact area between the reactant phases, the reactants may be agitated or mixed so as to finely disperse one reactant phase into the other reactant phase. In addition the immiscibility of the reactants, the chemical reaction rate of the components is also limited by reaction kinetics. The extent of conversion of reactants into products may be improved by increasing the residence time sufficient to achieve increased conversion of reactants.

Figure 1:
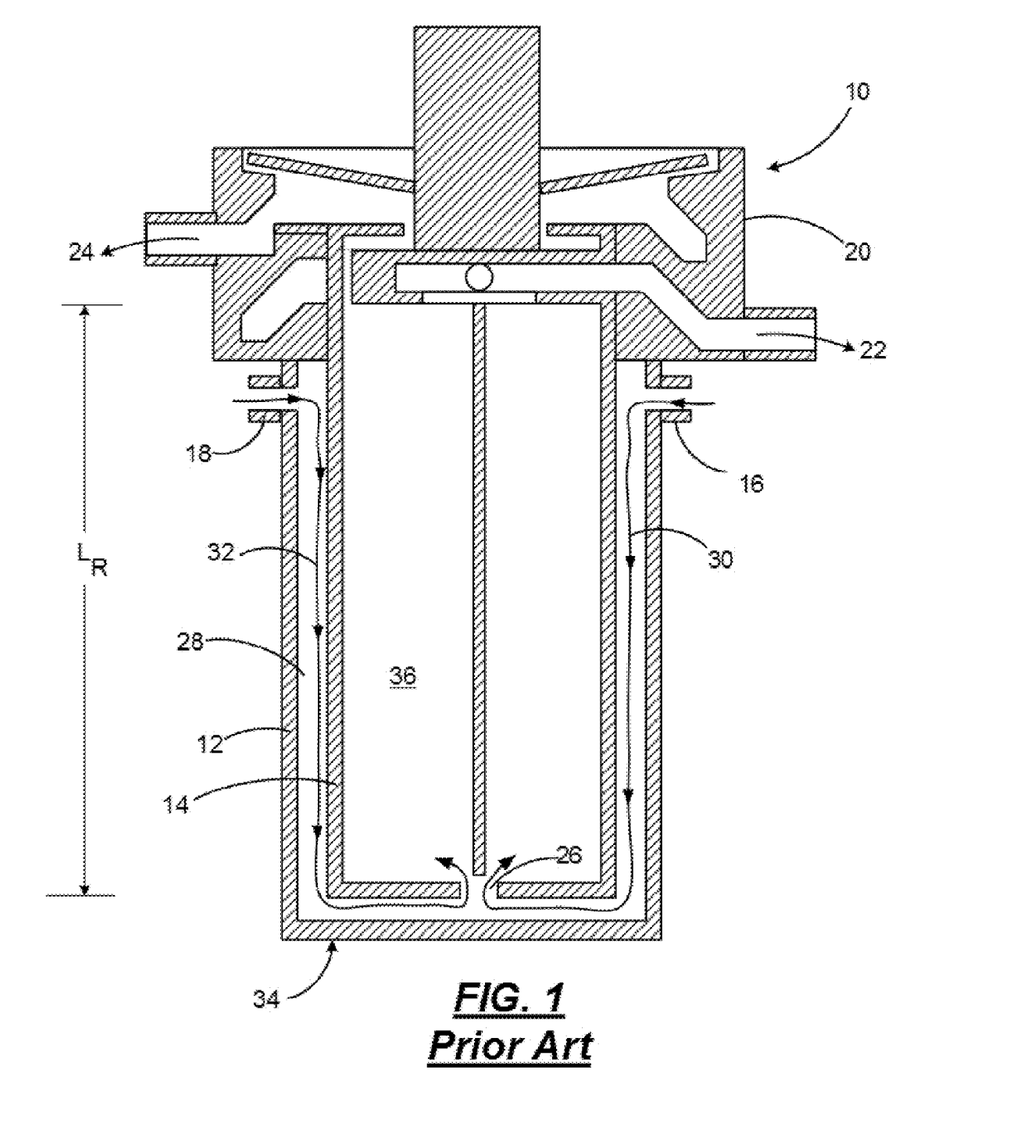
FIG. 1 is a schematic cross-sectional view, not to scale, of a prior art centrifugal separator.

With reference to FIG. 1, a conventional centrifugal separator 10 is shown. The centrifugal separator 10 includes a stationary shell 12 and a hollow rotor 14 rotatively disposed in the shell 12. Fluid inlets 16 and 18 are located typically in an upper portion of the shell 12 near a first end 20 of the separator 10. Fluid outlets 22 and 24 are also adjacent a first end 20 of the centrifugal separator 10. An opening 26 is provided in the rotor for inlet of fluid to be separated by rotation of the rotor 14. Fluid entering inlets 16 and 18 are mixed in an annular space 28 between the shell 12 and the rotor 14 and flow from the inlets 16 and 18 to the opening in the rotor 26 as shown by arrows 30 and 32. Baffles (not shown) are typically provided on a bottom plate 34 of the shell 12 in order to prevent the formation of a vortex between the rotor 14 and the bottom plate 34 that would inhibit the flow of fluid through the opening 26 into a hollow space 36 of the rotor. Intimate mixing of the fluids occurs in the annular space 28 between the shell 12 and the rotor 14. Separation of fluids from one another occurs in the hollow space 36 of the rotor 14, so that higher density fluids are caused to flow out of outlet 24 and lower density fluids are caused to flow from a center portion of the rotor 22 to outlet 22 by rotation of the rotor.

Figure 2:
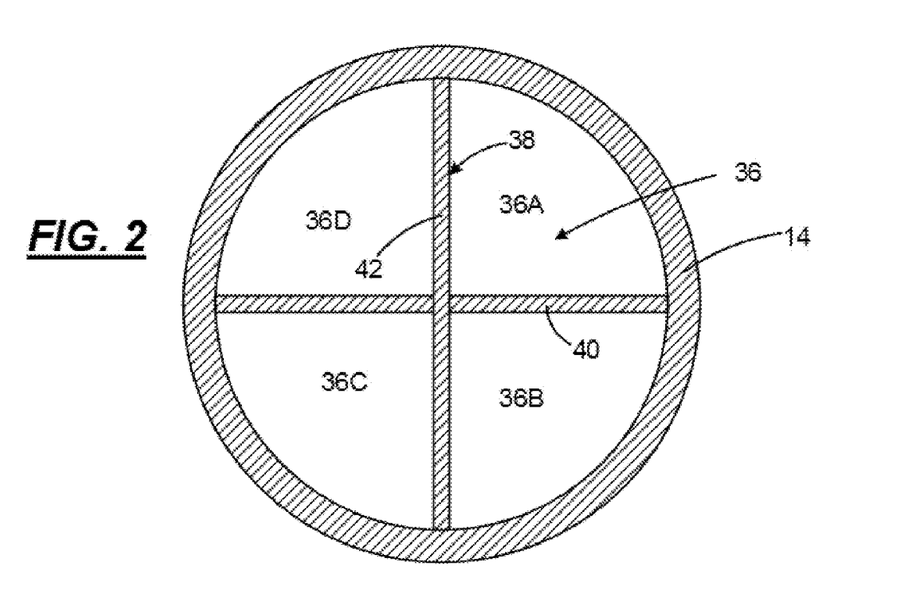
FIG. 2 is a top plan view, not to scale, of a rotor for a centrifugal reactor/separator according to an embodiment of the disclosure.
Figure 3:
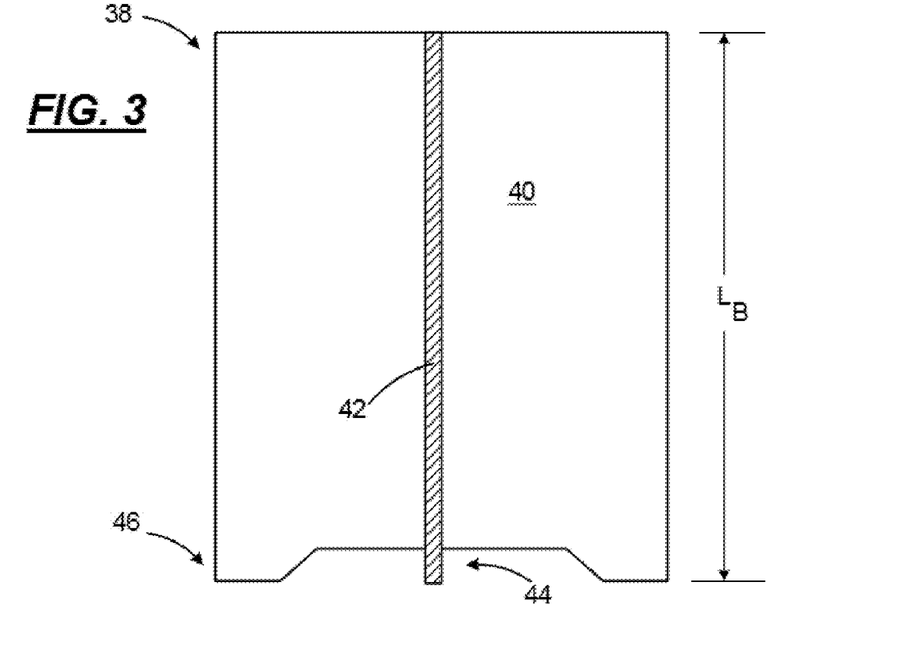
FIG. 3 is an elevational view, not to scale, of an insert baffle for a rotor according to the disclosure.

In order to apply a centrifugal force the fluid in the cavity 36 of the rotor 14, a baffle insert 38 (FIGS. 2 and 3) is disposed in the cavity 36 of the rotor. The baffle insert 38 may include one or more baffle members, such as baffle members 40 and 42 to divide the cavity 36 into four or more sections 36A-36D. The baffle insert 38 typically has a length $L_B$ that is substantially the same as a length $L_R$ of the rotor 14. The baffle insert 38 may also include a notch 44 adjacent a fluid inlet end 46 of the babble insert 38 to enable fluid from the opening 26 to enter the cavities 36A-36D.

It will be appreciated that the residence time of fluid in the annular space 28 for the centrifugal separator 10 is relatively short. The residence time of the fluids is defined by the volume of fluid in the annular space 28 divided by the flow rate of the fluid into and out of the centrifugal separator 10. In order to increase the residence time of fluid in the centrifugal separator 10 of a given size, the flow rate may be decreased. However decreasing the flow rate of the fluids reduces the throughput of the centrifugal separator.

According to embodiments of the disclosure, a reactor/separator is provided with a residence time increasing device. Such a residence time increasing device for increasing residence time for liquid/liquid contract or reaction is illustrated with reference to FIGS. 4 and 6. As described in more detail below, the reactor/separator according to the disclosure is designed to prevent flow directly into a rotor from an annular space between the rotor and shell which is opposed to the flow of fluid in the conventional centrifugal separator 10 as described above with reference to FIG. 1.

Figure 4:
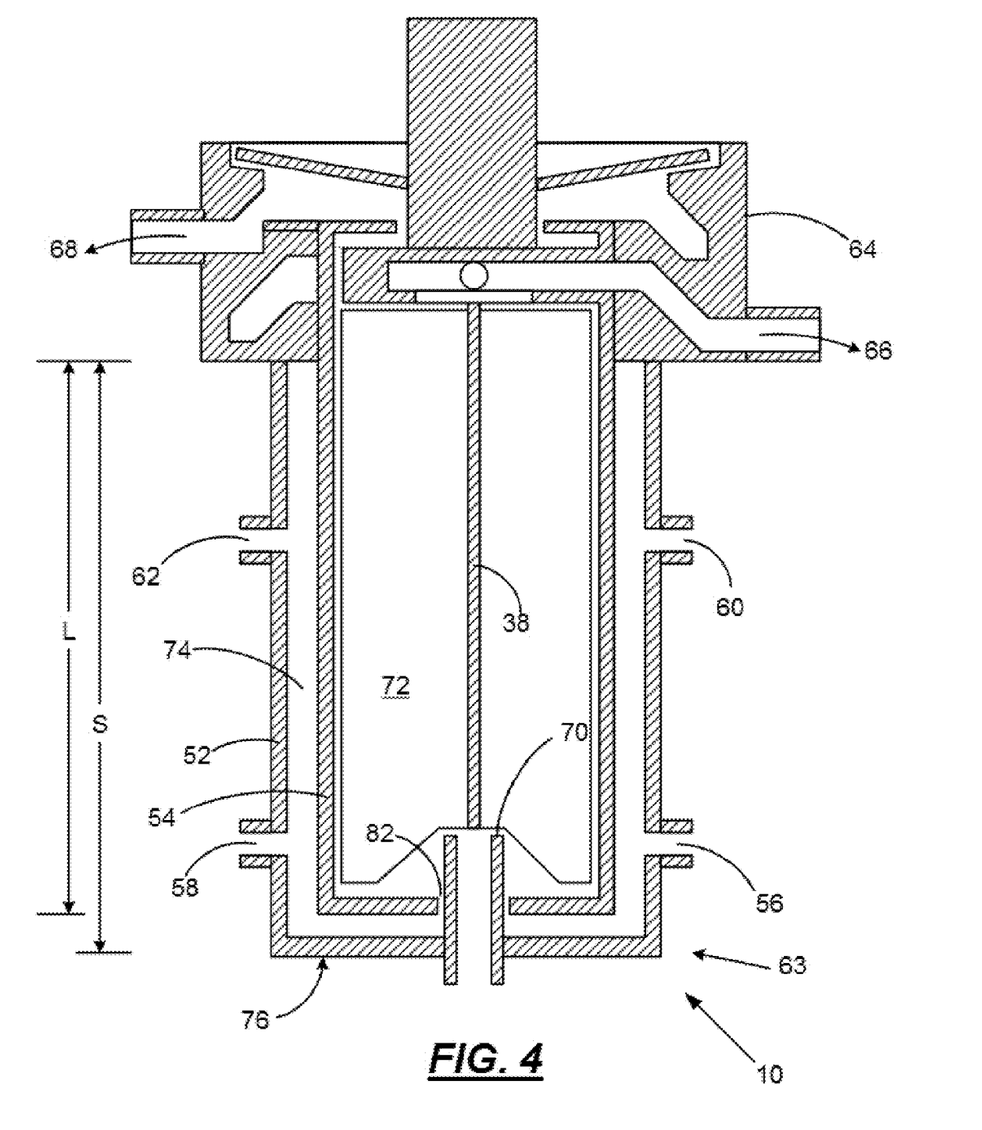
FIG. 4 is a schematic cross-sectional view, not to scale, of a centrifugal reactor/separators according to one embodiment of the disclosure.

With reference now to FIG. 4, a reactor/separator 50 according to one embodiment of the disclosure is illustrated. Like the conventional separator 10 (FIG. 1), the reactor/separator include a shell 52 and a rotor 54 rotatively disposed in the shell 52. The rotor 54 includes the baffle insert 38 (FIG. 1) for the same purposes a conventional centrifugal separator 10 includes such baffle insert 38. Fluid inlets 56 and 58 are provided in the shell adjacent a second end 60 of the reactor/separator. Fluid circulation outlets 60 and 62 are disposed in the shell 52 between a second end 63 and a first end 64 of the reactor/separator 50. Fluid product outlets 66 and 68 are provided adjacent the first end 64 of the reactor/separator 50 for higher and lower density fluids as described above. A standpipe 70 is provided for flow of fluid from the fluid circulation outlets 60 and 62 into a cavity 72 in the rotor 54.

Figure 5:
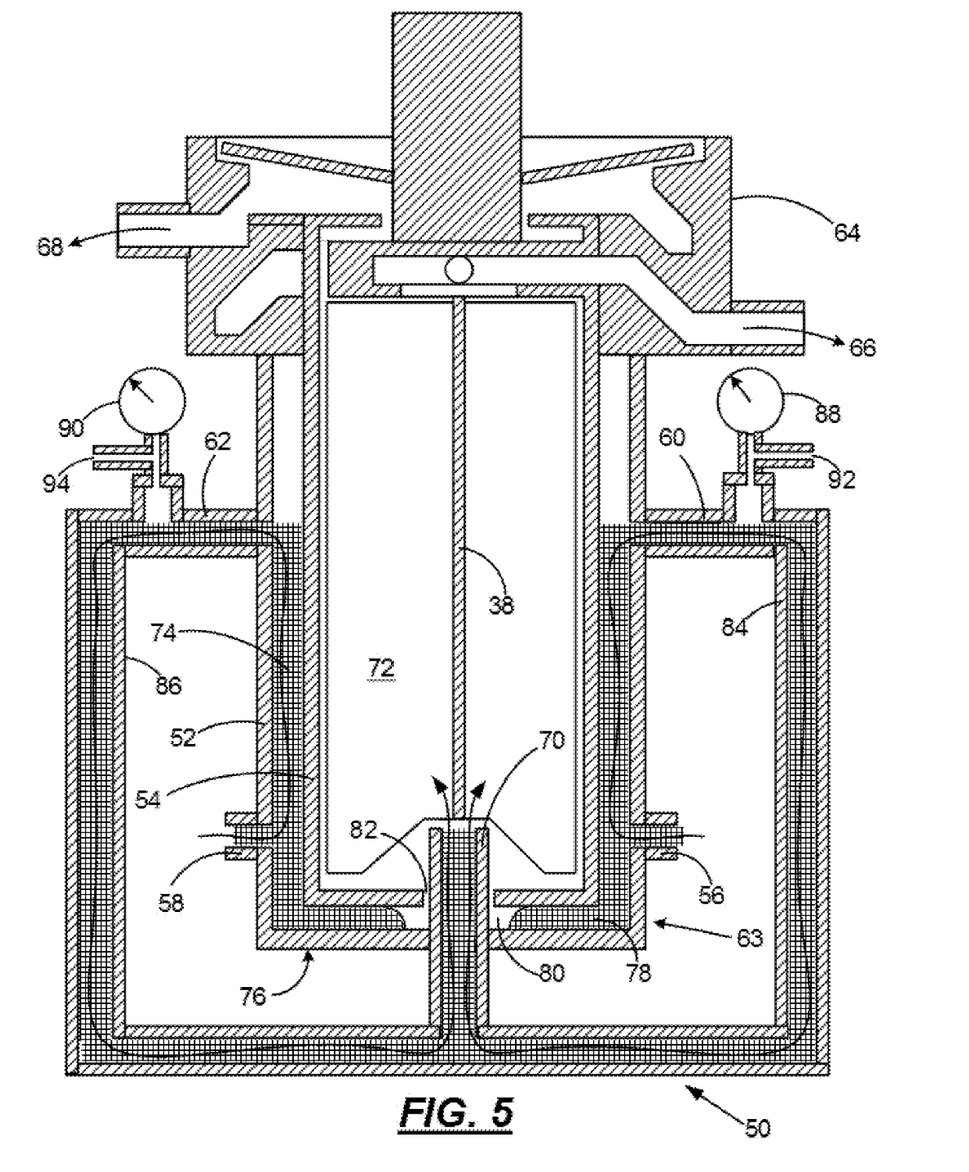
FIG. 5 is a schematic illustration, not to scale, of fluid flow from an inlet to the interior of a rotor for a centrifugal reactor/separator according to an embodiment of the disclosure.

The residence time increasing device, according to one embodiment of the disclosure is a fluid circulation system for the reactor/separator 50 as illustrated schematically in FIG. 5. Fluid 78 entering inlets 56 and 58 fills an annular space 74 between the shell 52 and the rotor 54 up to the fluid circulation outlets 60 and 62. A vortex 80 created by rotation of the rotor 54 between a bottom wall 76 of the shell and the rotor 54 prevents the fluid 78 from entering opening 82 in the rotor 54. In a conventional centrifugal separator 10, baffles are included on the bottom wall 34 (FIG. 1) of the shell to break any vortex that may form. However, an embodiment of the disclosure actually uses the vortex 80 to prevent the fluid 78 from short circuiting from the inlets 56 and 58 to the opening 82 of the rotor.

Figure 6:
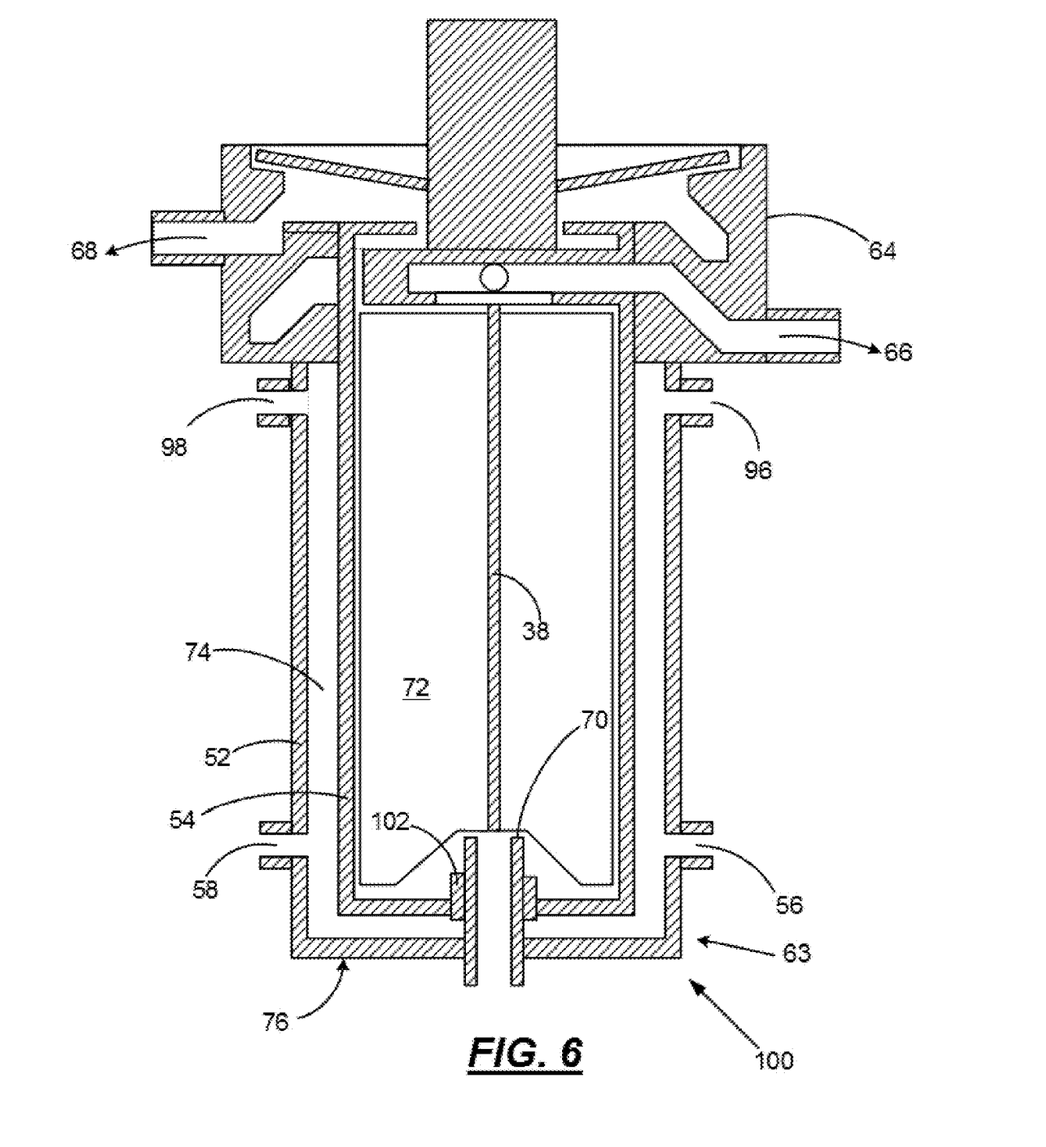
FIG. 6 is a schematic cross-sectional view, not to scale, of a centrifugal reactor/separators according to another embodiment of the disclosure.

In addition to one or more external circulation loops 84 and 86, a back pressure, as illustrated by gauges 88 and 90 may be applied to the external circulation loops 84 and 86 through pressure inlets 92 and 94 to further increase residence time in the circulation loops 84 and 86. By applying a back pressure, for example, a pressure of from about 1 to about 3 atmospheres on the circulation loops 84 and 86, the liquid flow rate in the circulation loop may be significantly decreased thereby increasing the residence time of the fluid 78 in the annular space 74 between the rotor 54 and the shell 52. In other alternative embodiments that may be used in the alternative or in addition to increasing the pressure, the annular space between the rotor 54 and the shell 52 may be increased, a length S of the shell 52 and a length L of the rotor 54 may be increased, or as shown in FIG. 6, fluid circulation outlets 96 and 98 may be located closer on the shell 52 to the first end 64 of a reactor/separator 100.

In a further embodiment of the disclosure, a bushing 102 (FIG. 6) may be used in the opening 82 (FIG. 4) of the rotor 54 to provide a dynamic seal between the rotor 54 and the standpipe 70. In such embodiment, the formation and maintaining of the vortex 80 is not necessary in order to prevent short circuiting of fluid 78 from the inlets 56 and 58 into the rotor cavity 72. While two circulation loops 84 and 86 are illustrated in FIG. 5, it will be appreciated that a single circulation loop 84 may be used or that more than two circulation loops may be used. Likewise, a corresponding number of fluid inlets, and fluid circulation outlets may be used to provide an increased residence time for a reactor/separator according to the disclosure.

By way of further example the following dimensions of a 50 millimeter reactor/separator may be used for conducting the reaction described above.

| Dimension | Centimeters |
| --- | --- |
| Overall height of reactor/separator | 25 |
| Length of rotor | 12 |
| Length of shell | 14 |
| Annular space 74 between shell and rotor side walls | 0.3 |
| Gap between bottom of shell and rotor | 0.2 |
| Opening between rotor and standpipe | 0.1 |

With reference again to FIG. 5, the based catalyzed esterification reaction described above may be conducted by feeding reactants through first and second inlets 56 and 58 into annular space 74 of the reactor/separator 50 between the rotor 54 and the shell 52. During the reaction, the stationary shell 52 may be heated in order to enhance the reaction rate and physical properties of the reactants. As the annular space 74 fills with fluid 78, the fluid enters the circulation loops 84 and 86 for flow through the standpipe 70 into the cavity 72 of the rotor 54. In the cavity 72, dispersed reaction products (fatty acid esters and glycerine) may be separated from one another by benefit of their disparate densities and centrifugal force. A less dense phase containing the fatty acid ester product flows from central portions of the cavity 72 into the less dense phase outlet 66. A more dense phase containing the glycerine and byproducts flows from outer portions of the cavity 72 into the more dense phase outlet 68. Between the less dense phase and more dense phase, there may be a region that includes a mixture of less dense phase and more dense phase.

The fatty acid ester product may be purified from unreacted materials or reaction byproducts by multiple sequential contacts with aqueous wash solutions using a similar reactor/separator 50. In the alternative, one or more conventional centrifugal separators may be used to wash and purify the product since residence time is not a factor once the reaction is complete.

Use of the reactor/separator 50 described above, to provide reaction between the triglyceride reactant and the alcohol reactant may significantly increase the reaction efficiency, due to highly efficient mixing of the reactants in the reactor/separator 50 and the increased residence time provided by the external circulation loops 84 and 86. Separation of the products by centrifugation as they are formed may increase product recovery efficiency and may eliminate a need for large holding vessels, in which the reaction product and byproducts are allowed to separate from one another over extended periods of time. Accordingly, use of centrifugal separation may significantly reduce the size of a production facility required to produce biodiesel at any specific production rate. In addition, use of reactor/separator 50 to provide the various product washing operations used to purify the fatty acid ester product may increase washing efficiency (due to the mixing efficiencies of the devices) and may eliminate the need for large washing vessels. The use of the reactor/separators 50 for the reaction and product separation, and for product washings, facilitates production of biodiesel on a continuous flow basis, which may increase throughput for a facility of a given size and simplify process control during the production of biodiesel products.

While the foregoing exemplary embodiments are based, in part, on the centrifugal separator 10 (FIG. 1), such devices may not provide sufficient residence time for fluids in a mixing zone when two immiscible liquids are contacted with one another, as in the case of biodiesel production. In fact, conventional centrifugal separators were designed to provide a minimum of residence time in order to minimize chemical and radiological degradation of organic extractants.

Without desiring to be bound by theoretical considerations, the reactor/separator device according to embodiments of the disclosure, for example, reactor/separator device 50, imparts shear forces on immiscible fluids fed to a narrow annular gap 74 between the stationary shell 52 and rotor 54 enclosed in the stationary shell 52. Shear forces imparted on the fluids in the gap 74 may create a finely divided dispersion via Couette mixing, thereby promoting transfer of solute(s) between phases and reducing mass transfer residence times. The dispersion then passes into a separator zone defined by the cavity 72 within the rotor 54 where it is separated into its component liquid phases by centrifugation as described above.

Conventional annular reactors may provide control of reactant residence times by controlling the feed rate of the reaction components to the reactor through fluid inlet ports. However, the residence time in the mixing zone between a rotor and stationary housing in conventional centrifugal contactors is limited and somewhat random. Consequently, obtaining effective mass transfer or accomplishing a chemical reaction in this zone is problematic when the kinetics of the reaction or the mass transfer between phases is relatively slow.

An exemplary embodiment of the disclosure may significantly improve the production of biodiesel products according to the above reaction by conducting the reaction in the centrifugal reactor/separator 50 that includes the external circulation loops 84 and 86 (FIG. 5). The circulation loops 84 and 86 may provide increased residence time by increasing the overall lengths of the loops. However, one means of increasing the residence time before the fluids enter the separation zone defined by the cavity 72 of the rotor 54 is by increasing a pressure in the circulation loops 84 and 86. By increasing the pressure in the circulation loops 84 and 86, fluid hold up in the annular space 74 may be controlled independent of fluid inlet feed rate, in order to provide a residence time required to achieve complete mass transfer between immiscible liquids or conversion of reactive components into products.

Figure 7:
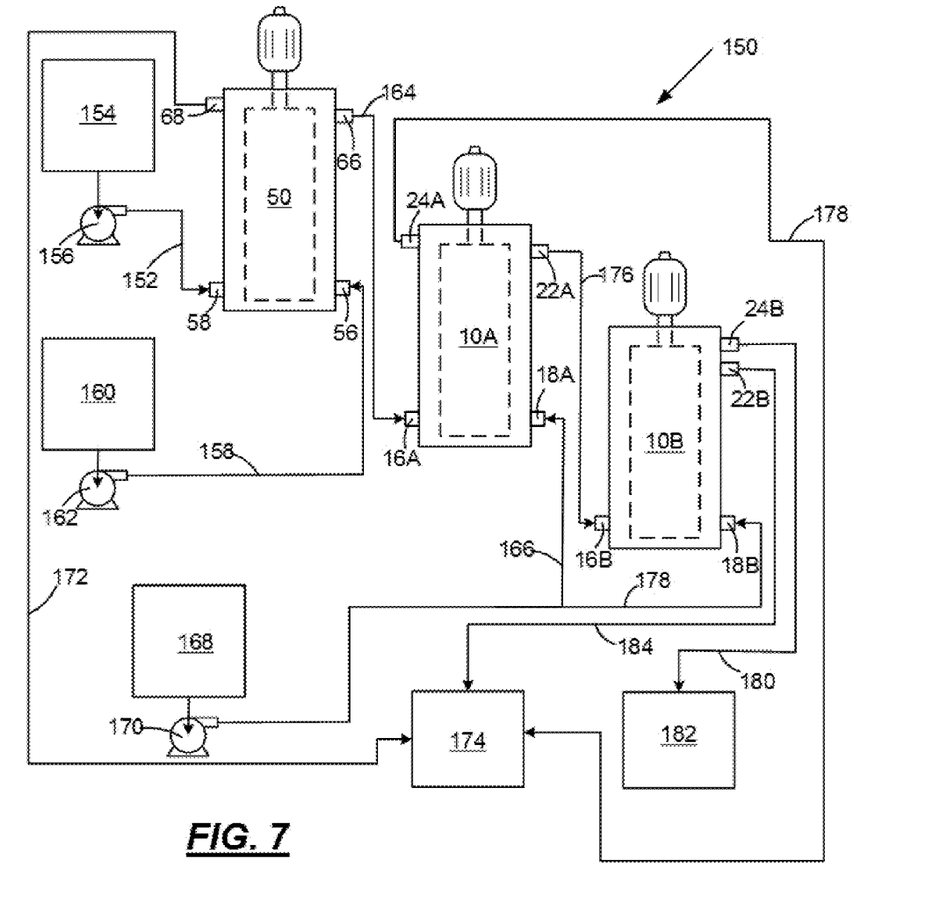
FIG. 7 is a schematic flow diagram of a process for using a centrifugal reactor/separator according to an embodiment of the disclosure.

With reference to FIG. 7, there is provided a system 150 for making and purifying a product, such as biodiesel, using an apparatus according to an embodiment of the disclosure. In the system 150 triglyceride feed component 152 is fed from a storage vessel 154 by a positive displacement pump 156 into the first inlet 56 of the reactor/separator 50 and an alcohol component 158 containing a catalyst such as a metal alkoxide is fed from a storage vessel 160 by a positive displacement pump 162 into the second inlet 58 of the reactor/separator 50.

After reaction and separation, in the reactor/separator 50, a less dense phase 164 containing the fatty acid ester product may be fed from outlet 66 to a first inlet 16A of a centrifugal separator 10A. In this case, a conventional separator 10, as described above, may be used to further purify the products once the reaction is completed in the reactor/separator 50 according to the disclosure. In the alternative, additional reactor separators 50 may be use to further purify the product. Wash water 166 from a wash water storage vessel 168 is fed by pump 170 into the second inlet 18A of the separator 10A for contact with the fatty acid ester product 164. Byproducts and impurities 172 in the more dense phase from reactor/separator 50 are fed from outlet 68 to a byproduct storage vessel 174 for further treatment, recycle, or disposal. The washed product 176 from separator 10A is fed through outlet 22A to a first inlet 16B of a centrifugal separator 10B for further purification and the byproducts and impurities 178 are fed from outlet 24A to the byproduct storage vessel 174. As with separator 10A wash water 178 is fed into a second inlet 18B to contact the washed product 176 from separator 10A. A purified product 180 is fed from outlet 24B into a product storage vessel 182 while the impurities and byproducts 184 are fed from outlet 22B into the vessel 174.

In the foregoing embodiment, the system 150 included one reactor/separator 50 and two centrifugal separators 10. However, the disclosed embodiments are not limited to one reactor/separator 50 and two centrifugal separators 10, as more or fewer reactor/separators 50 and/or centrifugal separators 10 may be used to make a biodiesel product according to the disclosed embodiments. For example, very large reactor/separators 50 may require fewer processing steps to purify the product. Alternatively, the product may be made on a batch basis, wherein intermediate storage vessels are used for byproducts and unpurified products. The unpurified products from the storage vessel may be fed back into the same reactor/separator 50, multiple times for contact with wash water to provide a purified product that is collected in a separator product storage vessel. It will be appreciated however, that the use of the reactor/separator 50 containing the external circulation loops 84 and 86 enables production of biodiesel products on a substantially continuous basis.

It is contemplated, and will be apparent to those skilled in the art from the preceding description and the accompanying drawings that modifications and/or changes may be made in the embodiments of the disclosure. Accordingly, it is expressly intended that the foregoing description and the accompanying drawings are illustrative of exemplary embodiments only, not limiting thereto, and that the true spirit and scope of the present disclosure be determined by reference to the appended claims.

What is claimed is:

1. An apparatus for manufacturing a biodiesel product from triglycerides comprising:
   a centrifugal reactor/separator comprising:
   a stationary shell;
   a rotating hollow cylindrical component disposed in the stationary shell, providing an annular space between the shell and hollow cylindrical component;
   at least one external circulation loop for increasing residence time of fluids in the reactor/separator between a first inlet and a cavity in the rotating hollow cylindrical component;
   a less dense phase outlet in fluid flow communication with an interior cavity of the hollow cylindrical component; and
   a more dense phase outlet in fluid flow communication with the interior cavity of the hollow cylindrical component;
   storage vessels for reactants in fluid flow communication with the centrifugal reactor/separator; and
   a pump for pumping reactants from the storage vessels to the centrifugal reactor/separator.

2. The apparatus of claim 1, further comprising product and byproduct storage vessels in fluid flow communication with the centrifugal reactor/separator.

3. The apparatus of claim 1, wherein the further comprises a pressure inlet for increasing a pressure in the external circulation loop.

4. The apparatus of claim 1, wherein the annular space between the stationary shell and rotating hollow cylindrical component is sufficient to provide couette mixing of reactants.

5. The apparatus of claim 1, wherein the annular space between the stationary shell and rotating hollow cylindrical component and the external circulation loop is sufficient to provide residence times ranging from about 5 seconds to about 10 minutes.

6. The apparatus of claim 1, further comprising a second external circulation loop for increasing residence time of fluids in the reactor/separator between a second inlet and a cavity in the rotating hollow cylindrical component.

7. The apparatus of claim 1, further comprising a standpipe for flow of fluid from the external circulation loop into the cavity in the rotating hollow cylindrical component.

8. The apparatus of claim 7, further comprising a bushing disposed in an opening of the rotating hollow cylindrical component between for sealing between the opening and the standpipe.

9. The apparatus of claim 1, wherein the hollow cylindrical component further comprises a baffle insert for imparting a centrifugal force on fluid in the cavity.

10. A centrifugal reactor/separator comprising: a stationary shell; a rotating hollow cylindrical component disposed in the stationary shell; a residence-time increasing device external to the stationary shell; a standpipe for introducing fluid into an interior cavity of the hollow cylindrical component from the residence-time increasing device; a first outlet in fluid flow communication with the interior cavity of the hollow cylindrical component for a less dense phase fluid; and a second outlet in fluid flow communication with the interior cavity of the hollow cylindrical component for a more dense phase fluid.

11. The centrifugal reactor/separator of claim 1, wherein the residence-time increasing device comprises at least one external fluid circulation loop.

12. The centrifugal reactor/separator of claim 11, wherein the external circulation loop provide an increase in residence time of fluid in the reactor/separator of greater than 50 percent compared a residence time of the same reactor/separator devoid of the external circulation loop.

13. The centrifugal reactor/separator of claim 11, wherein the residence-time increasing device further comprises a pressure inlet for increasing a pressure in the external circulation loop.

14. The centrifugal reactor/separator of claim 10, wherein the annular space between the stationary shell and rotating hollow cylindrical component is sufficient to provide couette mixing of reactants.

15. The centrifugal reactor/separator of claim 10, wherein a gap between the cup-shaped cylindrical structure and stationary shell ranges from about 2 millimeters to about 130 millimeters.

16. The centrifugal reactor/separator of claim 10, wherein the residence time increasing device comprises first and second external circulation loops for increasing residence time of fluids in the reactor/separator between first and second inlets and a cavity in the rotating hollow cylindrical component.

17. The centrifugal reactor/separator of claim 10, further comprising a bushing disposed in an opening of the rotating hollow cylindrical component for sealing between the opening and the standpipe.

18. The centrifugal reactor/separator of claim 10, wherein the hollow cylindrical component further comprises a baffle insert for imparting a centrifugal force on fluid in the cavity.

* * * * *